US008008908B2

(12) United States Patent
Doogue et al.

(10) Patent No.: US 8,008,908 B2
(45) Date of Patent: Aug. 30, 2011

(54) LOW POWER MAGNETIC FIELD SENSOR (75) Inventors: Michael C. Doogue, Manchester, NH (US); Shaun D. Milano, Chichester, NH (US); Paul David, Bow, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 779 days.

(21) Appl. No.: 11/767,549

(22) Filed: Jun. 25, 2007

(65) Prior Publication Data
US 2008/0315865 A1    Dec. 25, 2008

(51) Int. Cl.
*G01P 3/42* (2006.01)
(52) U.S. Cl. ......................................... 324/173; 324/244
(58) Field of Classification Search .................. 324/173, 324/207.25, 244, 249; 73/514.16, 514.31, 73/514.39
See application file for complete search history.

(56) References Cited

U.S. PATENT DOCUMENTS

| | | | |
|---|---|---|---|
| 3,863,153 A | | 1/1975 | Eshraghian |
| 4,196,391 A | * | 4/1980 | Weber ........................... 324/328 |
| 5,493,218 A | | 2/1996 | Hayashi et al. |
| 5,619,137 A | | 4/1997 | Vig et al. |
| 6,084,406 A | | 7/2000 | James et al. |
| 6,194,896 B1 | | 2/2001 | Takahashi et al. |
| 6,229,299 B1 | | 5/2001 | Strashny |
| 6,356,741 B1 | | 3/2002 | Bilotti et al. |
| 6,424,182 B1 | | 7/2002 | Plagens |
| 6,473,255 B2 | * | 10/2002 | Hatanaka et al. ............... 360/51 |
| 6,504,363 B1 | * | 1/2003 | Dogaru et al. ................ 324/235 |
| 7,148,642 B2 | | 12/2006 | Brannen et al. |
| 7,268,526 B1 | | 9/2007 | Smith |
| 7,405,554 B2 | * | 7/2008 | Yao ................................ 324/160 |
| 7,755,349 B2 | | 7/2010 | James |

(Continued)

FOREIGN PATENT DOCUMENTS
EP    0 019 827 A1    12/1980

OTHER PUBLICATIONS

Notification of Transmittal of the International Search Report and the Written Opinion of the International Searching Authority, or the Declaration, PCT/US2009/050459 dated Oct. 8, 2009, 3 pages.

(Continued)

*Primary Examiner* — Bot Ledynh
(74) *Attorney, Agent, or Firm* — Daly, Crowley, Mofford & Durkee, LLP (57) ABSTRACT

A magnetic field sensor for low power applications includes a magnetic field sensing element that, during sample intervals, provides a signal proportional to a sensed magnetic field and also includes a comparator circuit that, during the sample intervals, compares the magnetic field signal to threshold levels to generate a sensor output signal indicative of a strength of the magnetic field. According to a dual sample rate feature, initially the magnetic field signal is sampled at a first predetermined sample rate and, following detection of a transition of the sensor output signal, is sampled at a second, faster predetermined sample rate for a predetermined interval. According to a user-programmable sample rate feature, a user may select to operate the sensor at a fixed, predetermined sample rate or at a user-specified sample rate. The magnetic field sensor may also or alternatively detect the speed and/or direction of rotation of a rotating magnetic article.

15 Claims, 8 Drawing Sheets

U.S. PATENT DOCUMENTS

| | | | |
|---|---|---|---|
| 2004/0100251 A1* | 5/2004 | Lohberg | 324/166 |
| 2005/0194964 A1* | 9/2005 | Okada et al. | 324/165 |
| 2006/0006864 A1* | 1/2006 | Johnson et al. | 324/252 |
| 2006/0071659 A1* | 4/2006 | Tatschl et al. | 324/207.25 |
| 2006/0103547 A1 | 5/2006 | Salser, Jr. et al. | |
| 2008/0090683 A1* | 4/2008 | Englert et al. | 473/570 |
| 2008/0315865 A1 | 12/2008 | Doogue et al. | |

OTHER PUBLICATIONS

International Search Report, PCT/US2009/050459 dated Oct. 8, 2009, 3 pages.

Written Opinion of the International Searching Authority, PCT/US2009/050459 dated Oct. 8, 2009, 7 pages.

U.S. Appl. No. 12/239,881, filed Sep. 29, 2008, file through Dec. 17, 2009, 355 pages.

Datasheet, Diode Incorporated, "AH180, Micropower Omnipolar Hall-Effect Sensor Switch", Feb. 2007, 9 pages.

Datasheet, ELMOS Semiconductor AG, "E910.44, Ultra Low Power HALL-Sensor", Sep. 27, 2006, 5 pages.

Datasheet, Infineon Technologies, "TLE 4917, Low Power Hall Switch", Aug. 22, 2008 13 pages.

Datasheet, IXYS, "MX887P, μPower Hall-Effect Switch" Jul. 19, 2007, 4 pages.

Notification Concerning Transmittal of International Preliminary Report on Patentability and International Preliminary Report on Patentability (Chapter 1 of the Patent Cooperation Treaty), PCT/US2008/062620, date of mailing Jan. 14, 2010, 8 pages.

Datasheet, Panasonic, "AN48840B, AN48841B, Low current consumption, high sensitivity CMOS Hall IC Alternating magnetic field operation (For low-speed rotation detection)," Oct. 2006, 5 pages.

Datasheet, Toko, "Hall Sensor IC TK60011DS8/MC," undated, 12 pages.

Datasheet, Rohm, "BU52001GUL Hall Effect Switch," Apr. 2005, 6 pages.

Datasheet, Allegro Microsystems, Inc., "A3211, A3212 Micropower, Ultra-sensitive Hall-effect Switches," 2002, 2007, 12 pages.

Press Release and Datasheet, Allegro Microsystems, Inc., "A3422 Hall-Effect, Direction-Detection Sensors," undated, 11 pages.

Datasheet, E-CMOS, "EC2648-BL CMOS High Sensitivity Micropower Hall-Effect Switch," undated, 5 pages.

Datasheet, Diodes Incorporated, "AH1884 Micropower, Ultra-Sensitive Hall Effect Switch," Jul. 2007, 7 pages.

U.S. Appl. No. 12/239,881, filed Sep. 29, 2008, file from Dec. 17, 2009 through Dec. 1, 2010, 105 pages.

Chinese Office Action dated Jan. 25, 2011 for Chinese Patent Application No. 200880021801.9 and the English translation thereof, 11 pages.

Letter dated Mar. 2, 2011 in response to Chinese Office Action dated Jan. 25, 2011 for Chinese Patent Application No. 200880021801.9, 7 pages.

U.S. Appl. No. 12/239,881, filed Sep. 29, 2008, file from Dec. 1, 2010 through Mar. 2, 2011, 96 pages.

Notification and International Preliminary Report on Patentability with Written Opinion (Forms PCT/IB/326/373/237) for PCT/US2009/050459, dated Apr. 7, 2011, 8 pages.

Office Action dated Apr. 12, 2011 from U.S. Appl. No. 12/239,881, filed Sep. 28, 2008, 16 pages.

Notification of and International Search Report and Written Opinion of the International Searching Authority for PCT/US2008/062620, dated Oct. 1, 2008, 13 pages.

\* cited by examiner

LOW POWER MAGNETIC FIELD SENSOR

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to apparatus and methods for speed, position and/or direction sensing with a magnetic field sensor and more particularly, to such apparatus and methods for use in low power applications.

BACKGROUND OF THE INVENTION

Magnetic field sensors for sensing a magnetic field in low power applications are known. One such device is sold by Allegro Microsystems, Inc. of Worcester, Mass., the assignee of the subject invention, under part no. A3211. This device includes a Hall effect element for sensing the presence of a magnetic field of predetermined strength in a pole insensitive manner (i.e., regardless of the orientation of the magnetic article relative to the Hall effect element). The device includes a low power feature whereby portions of the device are activated for only a short. "awake" time interval during each clock cycle. Suitable low power applications include battery-operated, hand-held equipment, such as cellular and cordless telephones, pagers, palmtop or handheld computers, personal digital assistants (PDAs), and the like.

Magnetic field sensors for sensing rotational direction and speed of a rotating magnetic article, such as a rotating ring magnet, are also known. One such device is sold by Allegro Microsystems, Inc. of Worcester, Mass., the assignee of the subject invention, under part no. 3422. In particular, this device includes two Hall effect elements on the same silicon substrate and processing circuitry for providing a speed output signal indicative of the speed of rotation of the magnet and a direction output signal indicative of the direction of rotation of the magnet.

SUMMARY OF THE INVENTION

According to the invention, a magnetic field sensor includes a semiconductor substrate on which two, spaced magnetic field sensing elements are formed, each providing an magnetic field signal proportional to a sensed magnetic field associated with a magnetic article and a circuit configured to sample the two magnetic field signals at a sample rate and to generate a first sensor output signal indicative of a speed of rotation of the magnetic article and a second sensor output signal indicative of a direction of rotation of the magnetic article.

With this arrangement, sampling of the two magnetic field signal channels is synchronized (and preferably is controlled by the same clock signal) so that any inaccuracy in the sensor direction output signal due to differences in the sampling times of the two channels is eliminated. The magnetic field sensor may also include a user-programmable sample rate feature by which a user may select to provide an external clock signal to control the sample rate. A dual sample rate feature may also be provided by which the magnetic field signals are sampled at a first predetermined sample rate and sampled at a second, faster predetermined sample rate for a predetermined interval following detection of a transition of the sensor speed output signal. The sensor may be further configured to generate a third sensor output signal indicative of a position of the magnetic article relative to the magnetic field sensing elements.

Also described is a magnetic field sensor includes a magnetic field sensing element providing a magnetic field signal proportional to a sensed magnetic field associated with a magnetic article and a circuit configured to sample the magnetic field signal at a sample rate and to generate a sensor output signal indicative of the sensed magnetic field. According to a further aspect of the invention, the sample rate initially corresponds to a first predetermined sample rate and the sample rate corresponds to a second, faster predetermined sample rate in response to a change of state of the sensor output signal.

With this dual sample rate feature, the sensor is advantageously operated in a low power consumption mode (whereby the magnetic field signal is processed, or sampled, for only a portion of each clock cycle), during operating times when the sensor output signal is not adversely affected by such periodic processing of the magnetic field signal. When an output signal transition is detected, the sample rate is increased for the predetermined interval in order to thereby increase the accuracy of the sensor output signal.

According to a further aspect of the invention, a magnetic field sensor includes a magnetic field sensing element providing a magnetic field signal and a circuit configured to sample the magnetic field signal at a user-specified sample rate and to generate a sensor output signal indicative of a characteristic of the magnetic article. This user programmable sample rate feature advantageously provides flexibility for the user in terms of the desired sample rate. In fact, with this feature, the user can select to continuously process (i.e., continuously sample) the magnetic field signal.

A further magnetic field sensor embodiment includes a magnetic field sensing element providing a magnetic field signal proportional to a sensed magnetic field associated with a magnetic article, a circuit responsive to the magnetic field signal and configured to generate a sensor output signal indicative of a characteristic of the magnetic article, and a clock circuit. The clock circuit is responsive to at least one user-provided input signal and is configured to generate the clock signal having a sample rate determined by the input signal. The sample rate is a selected one of (a) initially a first predetermined sample rate and a second predetermined sample rate for a predetermined time interval following a change of state of the sensor output signal; (b) a user-defined sample rate; or (c) a fixed predetermined sample rate. This arrangement provides the benefits of both the dual sample rate feature and the user programmable sample rate feature noted above.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
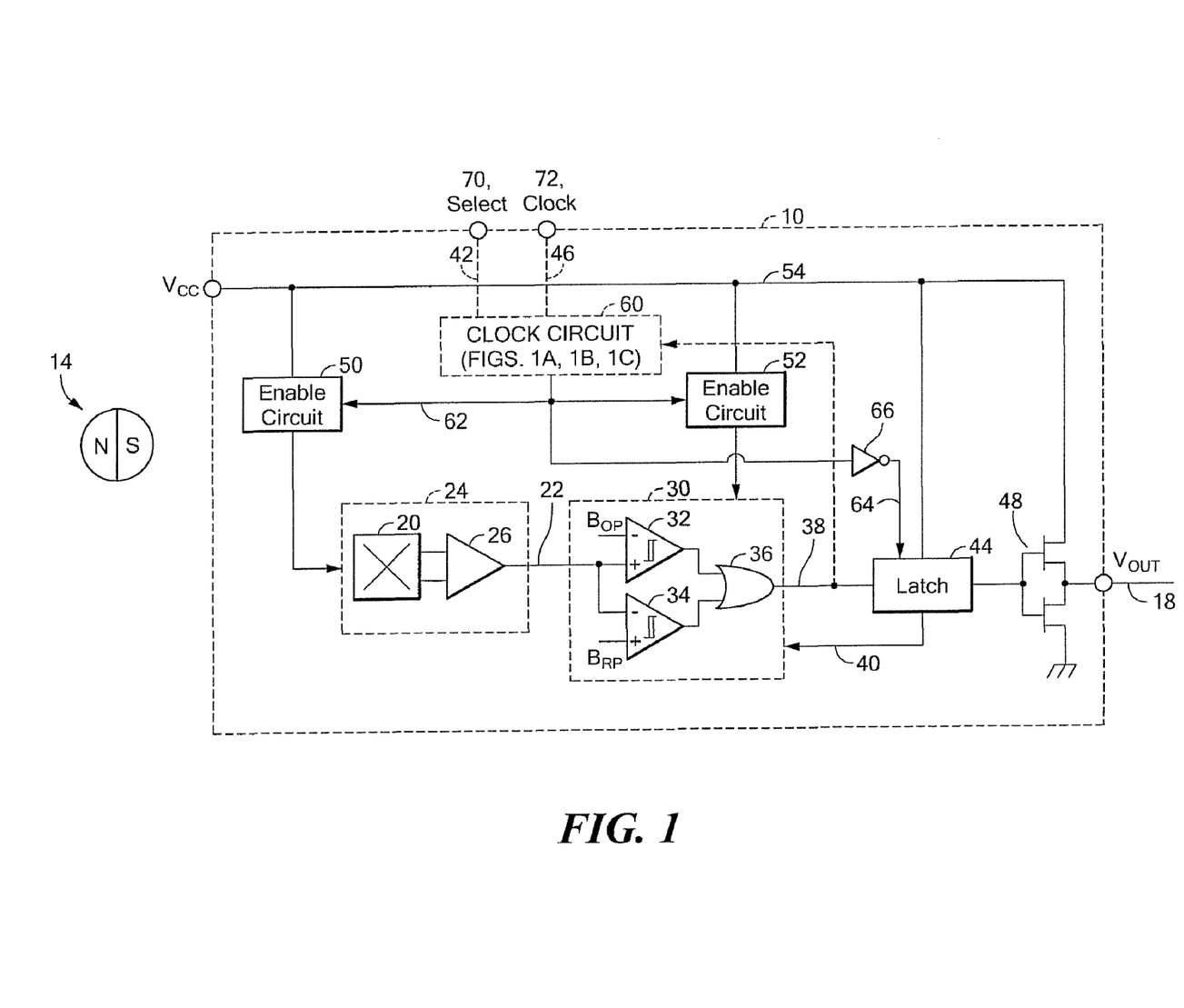
FIG. 1 shows a magnetic field sensor including a user programmable sample rate feature and/or a dual sample rate feature according to aspects of the invention.

Referring to FIG. 1, a low power magnetic field sensor 10 is provided with a dual sample rate feature and a user programmable sample rate feature, according to the aspects of the invention. The sensor 10 is positioned in proximity to a magnetic article 14 and provides a sensor output signal 18 indicative of the presence of a magnetic field of a predetermined strength. Thus, the sensor can be characterized as a proximity detector or a magnetic field switch.

By "low power," it is meant that the sensor 10 is suitable for use in limited power applications, such as battery-powered devices. Illustrative applications of this type include handheld equipment, such as cellular and cordless telephones, pagers, palmtop or handheld computers, personal digital assistants (PDAs), and the like.

The magnetic article 14 and sensor 10 are movable with respect to each other. The magnetic article 14 may be stationary and the sensor movable, the sensor may be stationary and the magnetic article movable, or both the magnetic article and the sensor may be movable. For example, the sensor 10 may be used in a cellular phone, with the magnet 14 located in the cover of a "flip-phone" arrangement and the sensor 10 located in the base portion, such that the sensor output signal 18 provides an indication of whether the cover is open or closed based on whether a magnetic field of a predetermined strength is detected.

The sensor 10 is provided in the form of an integrated circuit (IC) containing a semiconductor substrate on which the various circuit elements are formed. It will be appreciated by those of ordinary skill in the art however, that the particular boundary of the integrated circuit sensor 10 can be varied to suit a particular application such that elements shown and/or described as being contained within the IC may alternatively be provided external to the IC and in certain cases, elements shown and/or described as being external to the IC may alternatively be provided within the IC.

The sensor 10 includes a magnetic field sensing element 20, referred to alternatively as a magnetic field-to-voltage transducer, that provides a magnetic field signal 22 having a signal level proportional to the sensed magnetic field. In the illustrative embodiment, the magnetic field sensing element is a Hall effect element. It will be appreciated however that the magnetic field sensing element may take various forms known in the art, including but not limited to a Hall effect element, a vertical Hall effect element, a Giant Magnetoresistive (GMR) element, an Anisotropic Magnetoresistive (AMR) element, and a Tunnel Magnetoresistive (TMR) element. Also, the magnetic field sensing element 20 may comprise a single magnetically responsive element or, alternatively, may comprise a plurality of elements arranged in various configurations.

The magnetic field sensing element 20 is shown within a magnetic field signal processing circuit 24 which may contain various conventional circuits for processing the sensed magnetic field to generate the magnetic field signal 22. Generally, the circuit 24 contains at least an amplifier 26 for amplifying the output signal of the magnetic field sensing element. The circuit 24 may implement chopper stabilization, by which a supply voltage is alternately connected to contacts of the Hall effect element by a modulation switch circuit and the modulated signal is then demodulated by the amplifier in order to provide the magnetic field signal without offset voltage often associated with semiconductor Hall effect elements. Also, or alternatively, the circuit 24 may implement an offset adjustment feature, by which the magnetic field signal is centered within the power supply range of the sensor and/or a gain adjustment feature, by which the gain of the magnetic field signal is adjusted to maximize the peak-to-peak signal within the power supply range without causing clipping.

The sensor 10 further includes a comparator circuit 30 for processing the magnetic field signal 22 to generate the sensor output signal 18. The comparator circuit 30 includes a first comparator 32 for comparing the magnetic field signal 22 to a first threshold level or operate point, $B_{OP}$, and a second comparator 34 to compare the magnetic field signal 22 to a second threshold level or release point, $B_{RP}$. In particular, the output signal of comparator 32 is at a logic high level when the magnetic field signal 22 is greater than the $B_{OP}$ threshold level and transitions to a logic low level when the magnetic field signal falls below the $B_{OP}$ threshold level. The output signal of comparator 34 is at a logic high level when the magnetic field signal 22 is less than the $B_{RP}$ threshold level and transitions to a logic low level when the magnetic field signal exceeds the $B_{RP}$ threshold level. Preferably, the comparators 32, 34 (and other comparators described herein) include hysteresis such that, for example once the magnetic field signal exceeds the $B_{OP}$ threshold level, the magnetic field signal must fall to below a slightly lower voltage than the $B_{OP}$ threshold level before the output of comparator 32 goes low. Similarly, once the magnetic field signal falls to below the $B_{RP}$ threshold level, the magnetic field signal must exceed a slightly higher voltage than the $B_{RP}$ threshold level before the output of comparator 34 goes low.

The output signals of comparators 32 and 34 are coupled to inputs of an OR gate 36 that provides a comparison output signal 38 at its output, as shown. The comparison output signal 38 is at a first signal level (i.e., here a logic high level) when the magnetic field signal 22 is greater than either the first $B_{OP}$ threshold level or less than the second $B_{RP}$ threshold level. With this arrangement, the comparison output signal 38 can be characterized as being pole insensitive, or pole independent, since the signal will be at the same signal level when the magnetic article 14 is within a predetermined distance of the sensor 10 regardless of whether a north pole or a south pole of the magnet 14 is in proximity to the sensor (i.e., regardless of the orientation of the magnetic article with respect to the sensor).

A latch 44 is responsive to the comparison output signal 38 and latches the state of the comparison output signal in a manner described below. Suffice it to say here that the latch 44 allows low power operation in high speed applications, as will be described.

In order to achieve low average power operation, the sensor 10 may be activated (i.e., "awake") for a first time interval during each clock cycle, or period and deactivated (i.e., "asleep") for a second time interval during each period. This operation occurs during what is referred to herein as a low power mode of operation. More particularly, power is applied to certain portions of the sensor 10 during the first time intervals (i.e., during the "awake intervals") and is disconnected from the portions during the second time intervals (i.e., during the "sleep intervals"). The processing of the magnetic field signal 22 during the awake intervals is referred to herein as "sampling" the magnetic field signal and thus, the awake time intervals may be referred to alternatively as the "sample intervals."

Enable circuits 50, 52 are coupled between the power supply, or Vcc bus 54 and the processing circuit 24 and between the power supply bus 54 and the comparator circuit 30, as shown. A clock circuit 60 provides a clock, or enable signal 62 to the enable circuits 50, 52 to cause the enable circuits to connect and disconnect the power supply bus 54 to and from the processing circuit 24 and the comparator circuit 30 under the control of the clock signal. In one embodiment, the enable circuits 50, 52 are provided by a simple switch arrangement whereby the switch of each enable circuit 50, 52 is closed to connect Vcc to the respective circuit 24, 30 when the clock signal 62 is at a first signal level (e.g., a logic high level) and is open to disconnect Vcc from the respective circuit 24 when the clock signal 62 is at a second signal level (e.g., a logic low level).

According to the dual sample rate feature of the invention, initially, the clock signal 62 has a first predetermined sample rate (i.e., the sample intervals occur at a first predetermined rate) and thereafter, has a second, faster predetermined sample rate (i.e., the sample intervals occur at a second, faster predetermined rate) in response to detection of a state change of the comparison output signal 38. To this end, the comparison output signal 38 is coupled to the clock circuit 60 for detection of a state change. The connection of signal 38 to clock circuit 60 is optional since it need not be provided in embodiments not implementing the dual sample rate feature.

The clock signal 62 can be varied to achieve the two sample rates in different ways. In one embodiment, the clock signal 62 has clock pulses of at least a predetermined, minimum duration, corresponding to the awake, or sample intervals and the duration of the sleep intervals (and thus also the clock signal period and the sample rate, or rate of occurrence of the sample intervals) is varied in response to detection of a change of state of the comparison output signal. In general, the predetermined minimum awake duration is selected based on the minimum period of time required to allow the sensing element/process to turn on, stabilize and determine a proper signal. It will be appreciated by those of ordinary skill in the art however, that the awake intervals may also, or alternatively be varied in response to detection of a change of state of the comparison output signal. The significant parameter change differentiating the first sample rate from the second sample rate is simply that the magnetic field signal be sampled more, regardless of whether this is achieved by more frequent occurrences of the same duration awake intervals, longer awake intervals, or some combination thereof.

According to the user-programmable sample rate feature, the duration of the sleep and/or awake intervals may be varied according to an external clock signal provided by the user. In fact, as will be described, according to this feature, a user may even select to sample the magnetic field signal continuously, thereby operating with no sleep intervals at all. More particularly, inputs to the sensor IC 10, here labeled select input 70 and clock input 72, are coupled to the clock circuit 60, as shown. The select and clock inputs 70, 72 are adapted to receive user-provided select and clock signals 42, 46, respectively, to implement the user-programmable sample rate feature in embodiments containing such feature, as will be described. The inputs 70, 72 and the select and clock signals 42, 46, respectively, are optional since they need not be provided in embodiments not implementing the user-programmable sample rate feature.

The latch 44 is coupled to an output driver circuit 48, here a totem-pole push-pull output configuration as shown, that provides the sensor output signal 18 at a first signal level when the magnetic article 14 is within a predetermined distance of the sensor 10 and at a second signal level when the magnetic article is not within the predetermined distance of the sensor. Preferably, the latch 44 operates to latch the state of the comparison output signal 38 on the falling edge of each clock signal pulse which corresponds to the end of each awake interval. In the illustrative embodiment, an inverted version 64 of the clock signal 62 provided by an inverter 66 is coupled to the latch 44, which is a positive-edge triggered latch. Advantageously, by latching the signal 38 at the end of each awake interval, ample time is allowed for the sensor to fully "wake up" and therefore to provide a high integrity, high accuracy output signal before it is latched. It will be appreciated by those of ordinary skill in the art that the sensor output signal 18 (and other sensor output signals described herein) may convey its magnetic field information by providing different current levels and/or different voltage levels. Because the latch 44 "remembers" the state of the comparison output signal 38 and thus also the sensor output signal 18 during the sleep time intervals, when the device next wakes up, it remembers where it was in the hysteresis band of comparators 32, 34. To this end, a feedback signal 40 is coupled from the latch 44 to the comparator circuit 30, as shown.

Figure 1A:
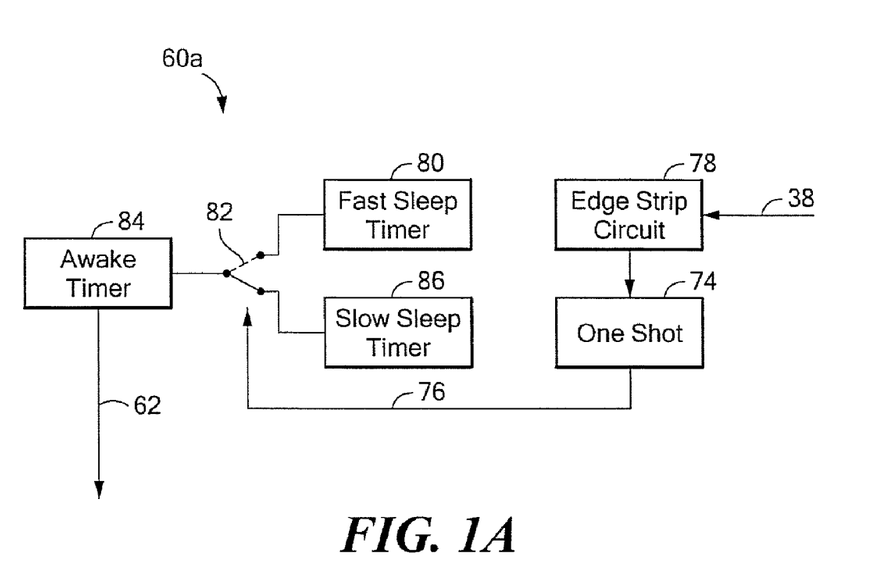
FIG. 1A shows one embodiment of the clock circuit of FIG. 1 including the dual sample rate feature.
Figure 1B:
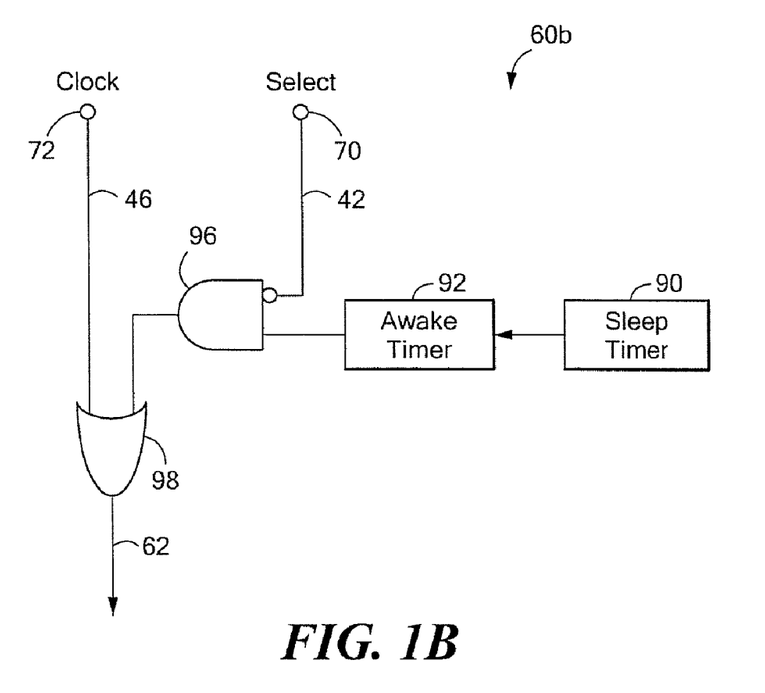
FIG. 1B shows an alternative embodiment of the clock circuit of FIG. 1 including the user programmable sample rate feature.
Figure 1C:
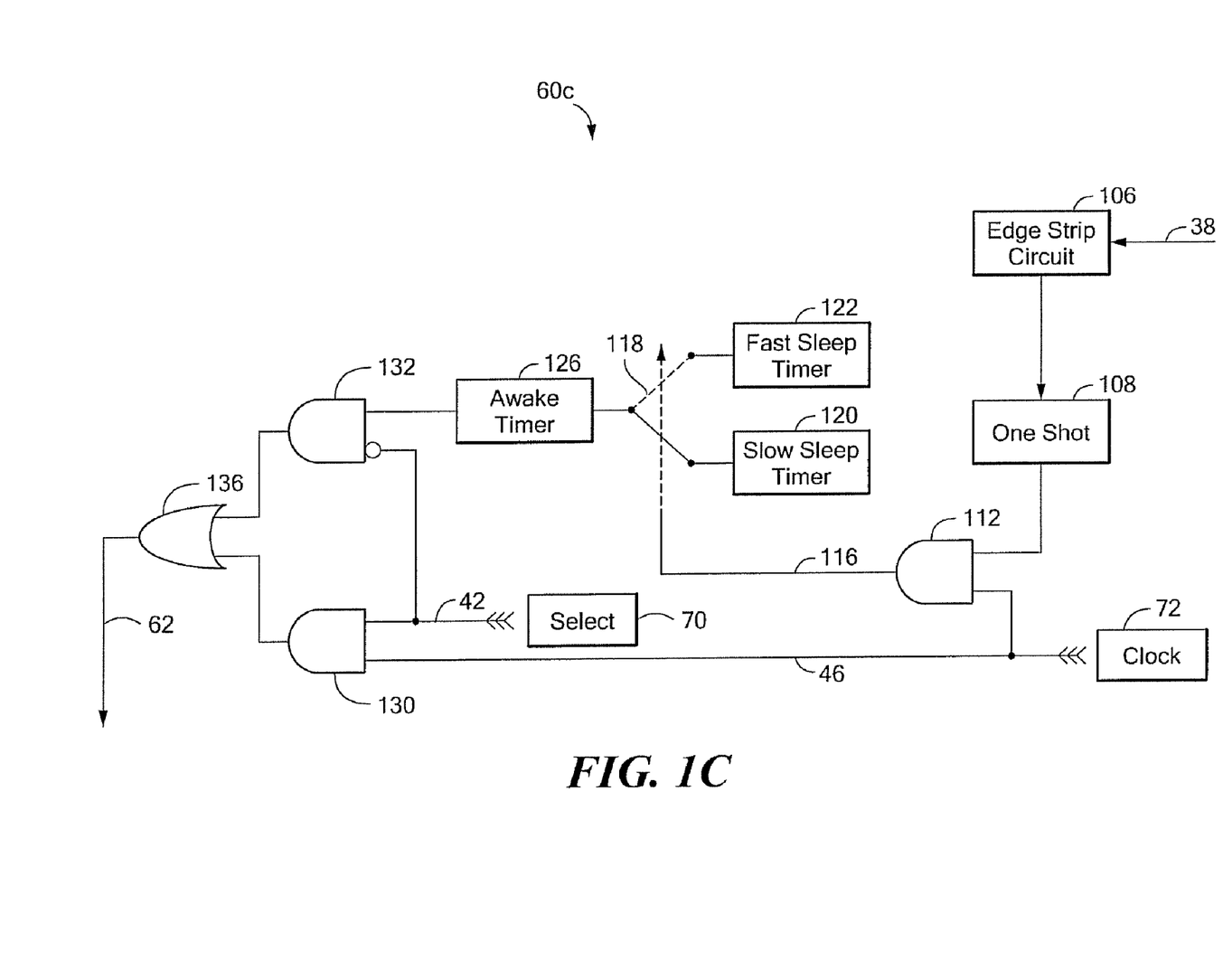
FIG. 1C shows still another embodiment of the clock circuit of FIG. 1 including both the dual sample rate feature and the user programmable sample rate feature.

FIGS. 1A, 1B, and 1C illustrate different embodiments 60a, 60b, 60c, respectively, of the clock circuit 60, depending on whether the sensor 10 includes the dual sample rate feature and/or the user-programmable sample rate feature. In particular, FIG. 1A shows an illustrative clock circuit 60a for use in a sensor containing only the dual sample rate feature, FIG. 1B shows an illustrative clock circuit 60b for use in a sensor containing only the user-programmable sample rate feature, and FIG. 1C shows an illustrative clock circuit 60c for use in a sensor containing both the dual sample rate feature and the user-programmable sample rate feature.

Referring to FIG. 1A, a clock circuit embodiment 60a for use in a sensor containing only the dual sample rate feature is shown. The clock circuit 60a is responsive to the comparison output signal 38 and generates the clock signal 62 for coupling to enable circuits 50, 52 (FIG. 1). More particularly, an edge strip circuit 78 is responsive to the comparison output signal 38 and generates a pulse signal at each transition (i.e., at each rising edge and at each falling edge) of the comparison output signal. The output of the edge strip circuit 78 is coupled to a one-shot 74 that provides a control signal 76 to control a switch 82. The control signal 76 is thus asserted (e.g., at a logic high level) for a predetermined duration as set by the one-shot 74 at each edge of the comparison output signal 38. The one-shot interval corresponds to a predetermined duration during which the clock signal 62 is at the second predetermined sample rate following a transition of the comparison output signal 38. In general, the predetermined duration is selected based on the intended application for the sensor. For example, in a thumbwheel or scroll wheel application, it is unlikely for a user to scroll for more than two seconds at a time. Thus, in this application, the one-shot 74 causes the control signal 76 to be asserted for intervals on the order of two seconds.

In operation, upon power being applied to the sensor 10, the switch 82 is in the position shown by a solid line, to couple a slow sleep timer 86 to an awake timer 84. The output of the awake timer 84 provides the clock signal 62. When the control signal 76 is asserted (e.g., is at a logic high level), the switch 82 toggles to the position shown by a dotted line, to couple a fast sleep timer 80 to the awake timer 84.

The awake timer 84 sets the awake, or sample intervals of the clock signal 62. As mentioned above, the awake intervals have at least a predetermined, minimum duration. The fast sleep timer 80 and the slow sleep timer 86 set the sleep intervals of the clock signal 62, depending on which timer 80, 86 is coupled to the awake timer 84 via switch 82. In one illustrative embodiment, the awake intervals are on the order of 50 µs, the slow sleep timer 86 establishes sleep intervals on the order of 250 ms, and the fast sleep timer establishes sleep intervals on the order of 50 µs. Thus, in this example, the first predetermined sample rate at which the magnetic field signal 22 is sampled when the slow sleep timer 86 is coupled to the awake timer 84 is on the order of 4 Hz and the second predetermined sample rate at which the magnetic field signal 22 is sampled following a transition of the comparison output signal 38 is on the order of 10 KHz.

It will be appreciated that various circuit schemes are possible for implementing the fast sleep timer 80, the slow sleep timer 86, and the awake timer 84 in order to provide the described clock signal 62. In one embodiment, the timers 80, 84, and 86 are implemented with an 18 bit counter controlled by a master clock of the sensor 10. With this arrangement, the switch 82 is implemented by different taps at the counter outputs being selected by the control signal 76. Advantageously, this arrangement facilitates providing the clock signal 62 at multiples of the chip clock frequency.

Figure 2:
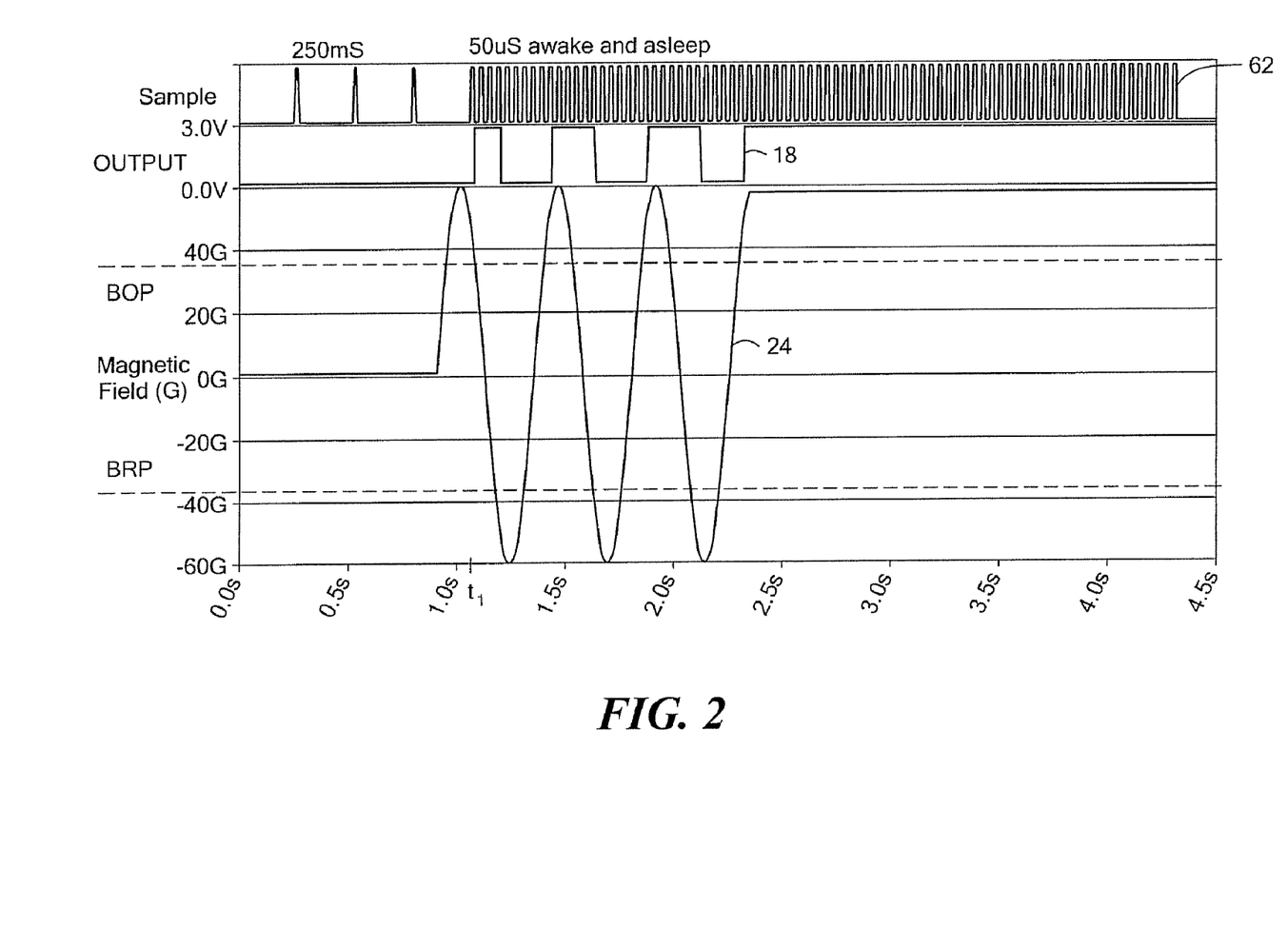
FIG. 2 shows several illustrative waveforms associated with the dual sample rate feature of the sensor of FIGS. 1, 1A, and 1C.

Referring also to FIG. 2, operation of the sensor 10 of FIG. 1 containing the clock circuit 60a of FIG. 1A will be described by reference to the illustrative waveforms. The clock signal 62 initially (i.e., following power up and prior to detection of a transition of the comparison output signal 38) corresponds to a first predetermined sample rate and thereafter (after time t1) corresponds to a second, faster predetermined sample rate. Also shown in FIG. 2 is the sensor output signal 18 and the magnetic field signal 22 in relation to the first and second threshold levels $B_{OP}$ and $B_{RP}$, respectively.

As is apparent, the magnetic field signal 22 crosses the first threshold level $B_{OP}$ at a time of approximately 1.0 second. However, because of the sample rate of the clock signal (i.e., because the comparator circuit 30 is not awake at time t=1.0 second), the sensor output signal 18 does not transition until a time of approximately 1.1 seconds. Clock circuit 60a detects the output signal transition and, in response, provides the clock signal 62 corresponding to the second, faster predetermined sample rate commencing just after a time of 1.1 seconds. Thereafter, when the sensor is operating at the second predetermined sample rate, it is apparent that the output signal 18 transitions closer to the time when the magnetic field signal 22 crosses the respective threshold level, as is desirable. For example, magnetic field signal 22 crosses the first threshold level again at time 1.4 seconds and the output signal 18 transitions to a logic high level at 1.45 seconds.

In the illustrative embodiment, prior to time t1, the clock signal pulse width (i.e., the awake times) is 50 µs and the signal period is 300 ms, resulting in a first predetermined sample rate of 4 Hz. After time t1, the clock signal pulse width is still 50 µs and the signal period is 100 µs. resulting in a second predetermined sample rate of 10 KHz. However, it will be appreciated by those of ordinary skill in the art that the awake times, sleep times, and/or clock signal period can be readily varied to suit a particular application. For example, different taps on the 18 bit counter used to provide the timers 80, 84, and 86 can be used to select different awake times, sleep times, and clock signal periods.

At a time of approximately 4.3 seconds, the clock signal 62 reverts to the first predetermined sample rate, as will occur after the one-shot 74 (FIG. 1A) times out, thereby causing the control signal 76 to transition and the switch 82 to revert to its initial, solid line position.

Referring now to FIG. 1B, a clock circuit embodiment 60b for use in a sensor containing only the user-programmable sample rate feature is shown. The clock circuit 60b contains a sleep timer 90 that sets the sleep intervals of the clock signal 62 and an awake timer 92 that sets the awake intervals of the clock signal 62. Here, the sleep intervals and the awake intervals are fixed, predetermined time intervals.

By providing an appropriate select input signal 42 and clock input signal 46 to the respective select and clock inputs 70, 72 of the sensor, a user can select between using the internal fixed clock signal as provided at the output of the awake timer 92 or providing an external clock signal 46 via the clock input 72. To this end, the clock circuit 60b contains an AND gate 96 having a first inverted input coupled to the select input 70 and a second input coupled to the output of the awake timer 92. The output of the AND gate 96 is coupled to a first input of an OR gate 98 and a second input to the OR gate 98 is coupled to the clock input 72. The clock signal 62 is provided at the output of the OR gate 98.

In operation, if the user wants to provide an external clock signal, then a logic high select signal 42 is coupled to the select input 70 and an external clock signal 46 is applied at the clock signal input 72. With this arrangement, the clock signal 62 is provided by the external clock signal 46 applied at the clock input 72.

Furthermore, as noted above, the user may select to operate with continuous sampling whereby the magnetic field is continuously processed without interruption (i.e., without sleep intervals). This operation is achieved by applying a logic high select signal 42 to the select input 70 and a logic high clock signal 46 to the clock input 72. With this arrangement, the enable circuits 50, 52 continuously connect the Vcc bus 54 to the processing circuit 24 and comparator circuit 30, respectively, and the lower power advantage of periodic sampling of the magnetic field signal is not achieved. Thus, this use of the user-programmable sample rate feature may be referred to as a full power mode of operation.

If the user wants to use the internally generated clock signal, then a logic low select signal is provided at the select input 70 and a logic low signal 46 is also provided at the clock input 72. With this arrangement, the clock signal 62 is provided at the output of the awake timer 92 and has fixed, predetermined sleep and awake intervals as established by the sleep timer 90 and the awake timer 92, respectively.

Figure 2A:
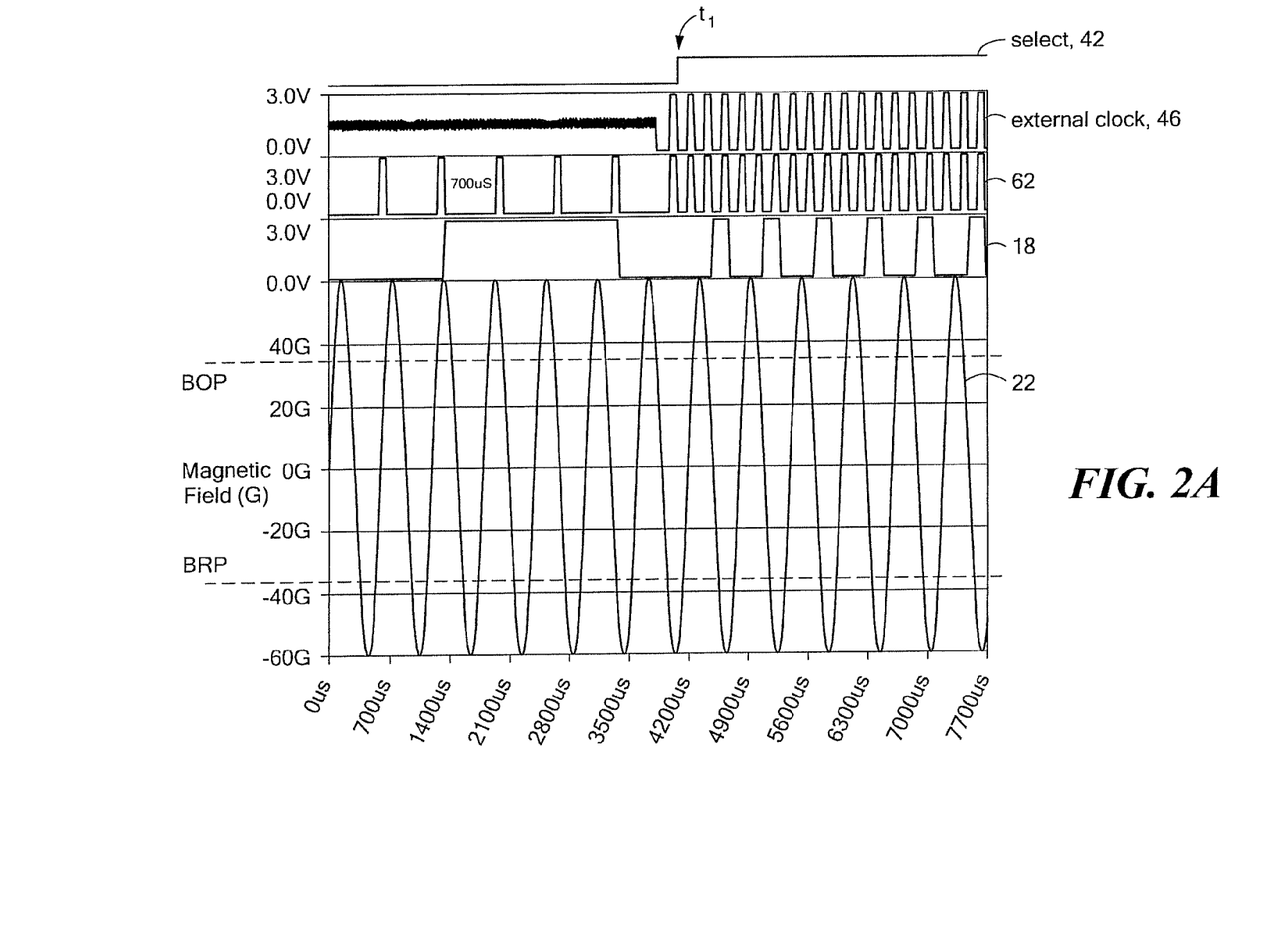
FIG. 2A shows several illustrative waveforms associated with the user programmable sample rate feature of the sensor of FIGS. 1, 1B, and 1C.

Referring also to FIG. 2A, illustrative waveforms associated with the user-programmable external clock feature of the sensor of FIG. 1 containing the clock circuit 60b of FIG. 1B are shown. In particular, an illustrative external clock signal 46 applied to clock input 72 of the clock circuit 60b of FIG. 1B is shown and the select signal 42 applied to the select input 70 of the clock circuit 60b is shown. Also shown is the clock signal 62 provided by the clock circuit 60b, the sensor output signal 18, and the magnetic field signal 22 in relation to the first and second threshold levels $B_{OP}$ and $B_{RP}$, respectively.

According to the illustrative waveforms, the user initially allows the sensor 10 to operate with the internal, fixed sample rate clock signal and, at a time t1, selects to use an external clock signal 46 applied to the clock input 72 by bringing a select signal 42 at the select input 70 to a logic high level. Thus, prior to time t1, the clock signal 62 is provided at a predetermined sample rate by the sleep timer 90 and the awake timer 92. In one example, the internal sample rate provided by timers 90 and 92 corresponds to awake intervals of 50 μs and sleep intervals of 700 μs. At time t1, the select input signal 42 transitions and the clock signal 62 is provided by the external clock signal 46, as shown. The illustrative external clock signal 46 has awake intervals of 50 μs and sleep intervals of 50 μs. More generally however, the awake interval, sleep interval and/or period of the external clock signal 46 can be varied to suit a particular application. In applications in which the external clock signal 46 contains both awake and sleep intervals, it is necessary that the awake intervals have at least the predetermined minimum duration.

Various schemes are contemplated by which the external clock signal 46 may be provided. For example, a resistor and current source may be coupled to the clock input 72 in order to charge an internal capacitor (not shown), a programmable oscillator may be coupled to the input 72, or a pulse-width-modulation (PWM) signal may be coupled to the input 72, as may be provided by a microcontroller.

As a further alternative, a circuit (not shown) may be provided to detect the number of transitions of the sensor output signal 18 within a predetermined time interval and to select applying an external clock signal 46 if the number of output signal transitions is less than a predetermined number, for example, thereby indicating that output signal transitions are being missed. By way of an illustrative example, in an application in which the magnetic article 14 is a ring magnet that has four pole pairs and that rotates at 100 rpm, it is expected that the sensor output signal 18 transitions at least once every 1 ms. If such expected output signal transitions are not detected, then an external clock signal 46 may be applied.

As is apparent, before time t1, the output signal 18 does not transition each time the magnetic field signal 22 crosses one of the threshold levels $B_{OP}$, $B_{RP}$ as it should. However, under the control of the external clock signal 46, after time t1, output signal transitions occur as desired.

Referring to FIG. 1C, a further alternate clock circuit embodiment 60c for use in the sensor 10 of FIG. 1 includes both the dual sample rate feature and the user-programmable sample rate feature. With this arrangement and under the control of the user-provided select input signal 42 and clock input signal 46, the sensor 10 is capable of operation in one of three different modes: (1) a dual sample rate mode in which the magnetic field signal 22 is sampled at a first or a second predetermined sample rate as described above in conjunction with FIG. 1A; (2) a user-programmable sample rate mode in which the magnetic field signal is sampled at a user-specified rate as described above in conjunction with FIG. 1B; or (3) an internal, fixed sample rate mode in which the magnetic field signal is sampled at a fixed predetermined sample rate as also described above in conjunction with FIG. 1B.

The clock circuit 60c contains an edge strip circuit 106 responsive to the comparison output signal 38 (FIG. 1) and providing an edge-stripped signal to a one-shot 108. The output of the one-shot 108 provides a signal at a high logic level for a duration set by the one-shot following each transition of the comparison output signal. The output of the one-shot 108 and the clock input signal 46 are coupled to respective inputs of an AND gate 112, as shown. The output of AND gate 112 provides a control signal 116 to a switch 118. According to the dual sample rate feature, the switch 118 is either in a first position (shown by a solid line) to couple a slow sleep timer 120 to an awake timer 126 or in a second position (shown by a dotted line) to couple a fast sleep timer 122 to the awake timer 126. More particularly, initially (i.e., following power up of the sensor and prior to a transition of the comparison output signal 38), the control signal 116 causes the slow sleep timer 120 to be coupled to the awake timer 126 so that the magnetic field signal 22 is sampled at a first predetermined sample rate, as is set by the slow sleep timer 120 and the awake timer 126. Following a transition of the comparison output signal 38, the control signal 116 causes the switch 118 to couple the fast sleep timer 122 to the awake timer 126 so that the magnetic field signal is sampled at a second, faster predetermined sample rate, as is set by the fast sleep timer 122 and the awake timer 126.

The clock circuit 60c also contains additional gates by which the user-provided select input signal 42 and clock input signal 46 may control the clock signal 62. The select input 70 is coupled to an input of an AND gate 130 and to an inverted input of an AND gate 132. A second input to the AND gate 130 is provided by the clock input signal 46, as shown. And a second input of the AND gate 132 is provided by the awake timer 126. The output of the AND gate 130 and the output of the AND gate 132 are coupled to respective inputs of an OR gate 136, that in turn provides the clock signal 62 at its output.

In operation, if the user wants to operate the sensor 10 using at a fixed, internal sample rate, the select signal 42 and the clock signal 46 are brought to logic low levels. With this arrangement, the output of AND gate 112 is low, thereby causing the control signal 116 to keep the switch 118 in the solid line position so that the slow sleep timer 120 is coupled to the awake timer 126. Also, the output of AND gate 130 is low. Because the select input signal 42 is also low, the output of AND gate 132 will be high when the output of the awake timer 126 is high and low when the output of the awake timer 126 is low (i.e., the output of AND gate 132 and the output of OR gate 136 will follow the output of the awake timer 126). Thus, the clock signal 62 is provided by the output of the awake timer 126 at a fixed sample rate, as is established by the combination of the slow sleep timer 120 and the awake timer 126.

If the user wants to operate the sensor 10 in the dual sample rate mode, then the select input signal 42 is set to a logic low level and the external clock signal 46 is set to a logic high level. With this arrangement, the output of AND gate 130 is low and the output of AND gate 132 will follow the output of the awake timer 126. Because the external clock signal 46 is high, in response to a transition of the comparison output signal 38, the output of AND gate 112 goes high, thereby causing the switch 116 to toggle to the dotted line position so as to couple the fast sleep timer 122 to the awake timer 126. At a predetermined interval following the comparison output signal transition (which interval is set by the one-shot 108), the control signal 116 toggles to its solid line position, thereby causing the signal at the output of awake timer 126 to have sleep intervals set by the slow sleep timer 120. In this manner, a low select input signal 42, and a high clock input signal 46 cause the sensor 10 to be operated in the dual sample rate mode.

Finally, if the user wants to operate the sensor in the user-programmable sample rate mode, by providing the external clock signal 46 at a desired sample rate (or, at a static high logic level for the full power mode of operation), then the select input signal 42 is brought to a logic high level. With this arrangement, the output of AND gate 130 will follow the external clock signal 46 (i.e., will be high when the external clock signal 46 is high and low when the external clock signal 46 is low) and the output of AND gate 132 will be low as a result of the logic high select input signal 42. The output of OR gate 136 will follow the output of AND gate 130 and thus, will follow the external clock signal 46 applied to the clock input 72, as desired.

Figure 3:
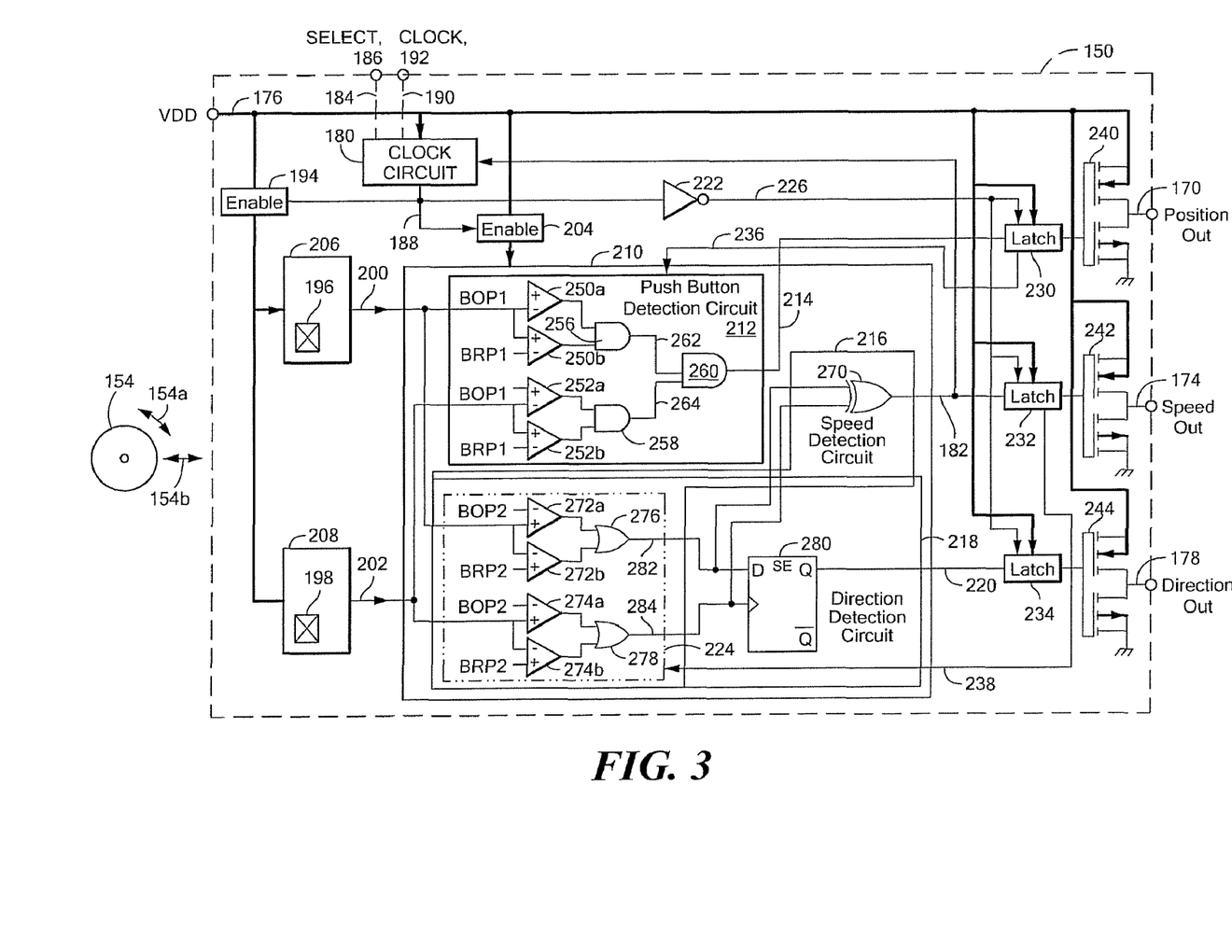
FIG. 3 is a simplified schematic of an alternative magnetic field sensor embodiment including position, speed and direction sensing and also including both the user programmable sample rate feature and the dual sample rate feature.

Referring to FIG. 3, an alternative magnetic field sensor 150 is provided for sensing, in addition to the presence of a magnetic field of a predetermined strength (i.e., the proximity or position of a magnetic article 154), the speed and direction of rotation of the magnetic article 154. Like the sensor 10 of FIG. 1, sensor 150 is a low power sensor capable of operation in limited power applications.

Figure 4:
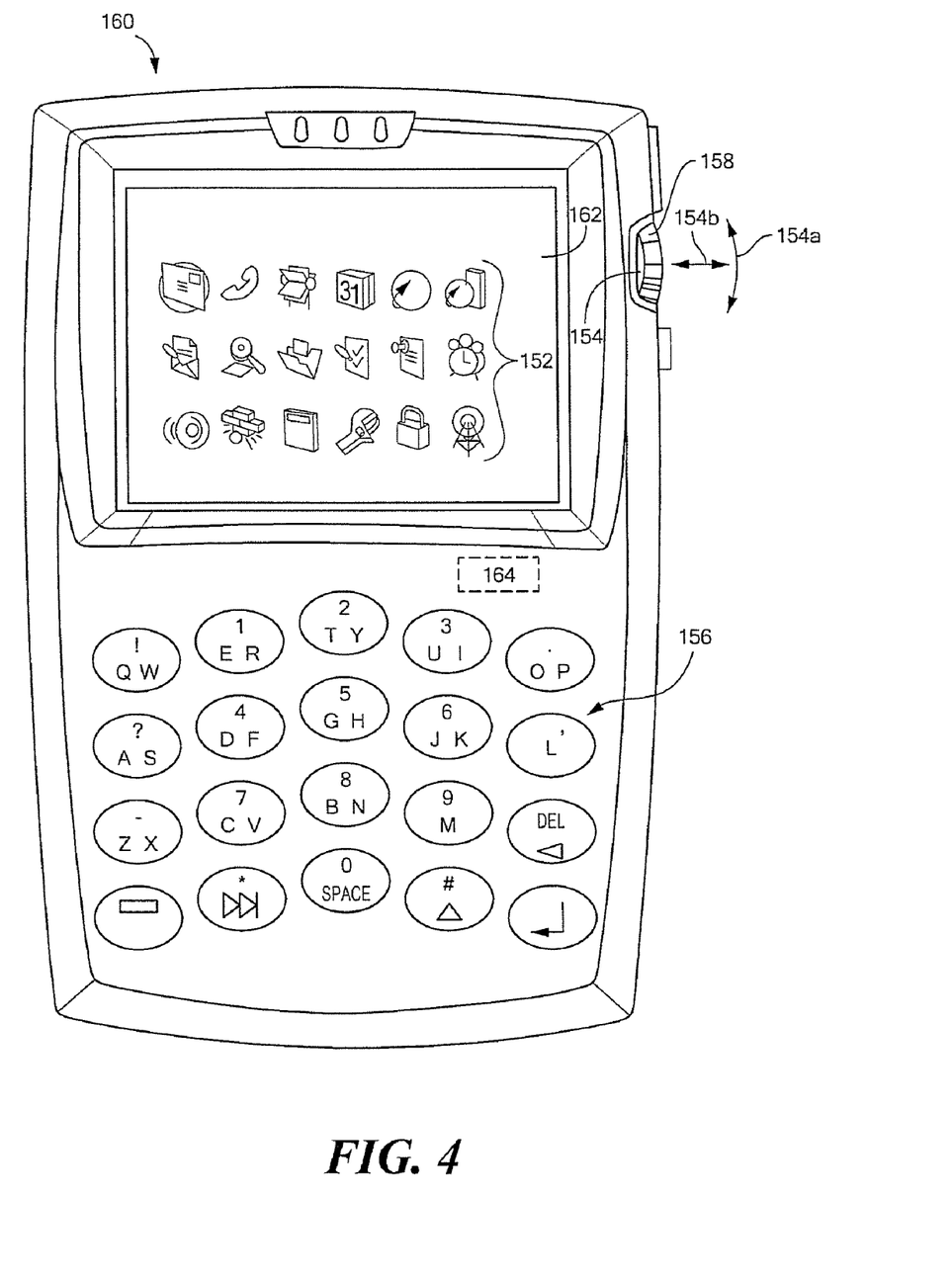
FIG. 4 is a plan view of a handheld electronic device containing the magnetic field sensor of FIG. 3.

Referring also to FIG. 4, one such application is a wireless handheld device 160 containing the sensor 150 and magnetic article 154, with the magnetic article coupled to or forming part of a thumbwheel, or simply a rotary control element 158. Various input devices, such as the thumbwheel 158 and a keypad 156, can be actuated to control various functions of the device. For example, the thumbwheel 158 can be rotated in one direction to achieve one function, the thumbwheel 158 can be rotated in the opposite direction to achieve another function (such rotation indicated by arrow 154a) and/or the thumbwheel can be pushed in or released in a push button fashion (along an axis indicated by arrow 154b) to achieve still another function. Some such devices 160 are capable of entering a low power or sleep mode in order to conserve battery power under certain conditions (e.g., when one or more of the input devices such as thumbwheel 158 is not actuated for a predetermined duration).

The sensor 150 provides an interface between the thumbwheel 158 and a control element of the device, such as a microprocessor 164, in order to affect the desired function. To this end, the sensor 150 detects the magnetic field associated with the magnetic article 154 so as to provide a first, position output signal 170 indicative of a position of the thumbwheel relative to the sensor 150, a second, speed output signal 174 indicative of the speed of rotation of the thumbwheel, and a third, direction output signal 178 indicative of the direction of rotation of the thumbwheel.

In order to achieve low power operation, the sensor 150 contains one or both of the above-described dual sample rate feature and the user-programmable sample rate feature. To this end, the sensor includes a clock circuit 180 responsive to a speed signal 182, a user-provided select input signal 184 provided at a select input 186 of the sensor IC 150, and a user-provided clock input signal 190 provided at a clock input 192 of the IC. The sensor further includes enable circuits 194 and 204 that are responsive to a clock signal 188 provided by the clock circuit, as will be described.

The sensor 150 includes two magnetic field sensing elements 196, 198 that are spaced apart on the semiconductor substrate, each of which provides a respective magnetic field signal 200, 202 having a signal level proportional to the sensed magnetic field. Sensing element 196 and its associated circuitry may be referred to as providing one channel and sensing element 198 and its associated circuitry may be referred to as providing a second channel. Each of the magnetic field sensing elements 196, 198, like the sensing element 20 of FIG. 1, may take the form of various conventional magnetic field-to-voltage transducers including, but not limited to Hall effect elements, and may form part of a respective processing circuit 206, 208 containing signal conditioning circuitry such as chopper stabilization, signal amplification, offset adjustment and/or gain adjustment.

A detection circuit 210 includes a position or push button detection circuit 212 providing a position signal 214, a speed detection circuit 216 providing the speed signal 182, and a direction detection circuit 218 providing a direction signal 220, with the speed and direction detection circuits sharing a common comparator circuit 224, as will be described. Each of the output signals 214, 182, and 220 of the detection circuit 210 is coupled to a respective latch 230, 232, 234 which operate to latch the respective output signal during the sensor sleep intervals under the control of the clock signal 188 (or more particularly an inverted version 226 of the clock signal 188 as provided by inverter 222) in the same fashion as latch 44 (FIG. 1). Each latch is coupled to a respective output driver 240, 242, 244 that provide the sensor output signals 170, 174, 178, respectively, as may be provided to the processor 164 of the device 160 of FIG. 4 for example. Further, latch 230 is coupled to comparator circuit 212 via feedback signal 236 and latch 232 is coupled to comparator circuit 224 via feedback signal 238 so that upon a next sample interval, the sensor knows where the magnetic field signal is relative to the hysteresis band of the respective comparators.

In order to detect the proximity of the magnetic article 154, for example the position of the thumbwheel 158 of FIG. 4, the push button detection circuit 212 includes a first pair of comparators 250a, 250b responsive to first and second threshold levels $B_{OP}$, $B_{RP1}$ and having outputs coupled to inputs of an AND gate 256, such that the output of AND gate 256 is high only when the magnetic field signal 200 is within the voltage range between the first and second threshold levels $B_{OP1}$, $B_{RP1}$. Similarly, a second pair of comparators 252a, 252b provided output signals to inputs of an AND gate 258, such that the output of AND gate 258 is high only when the magnetic field signal 202 is within the voltage range between the first and second threshold levels $B_{OP1}$, $B_{RP1}$. The outputs of AND gates 256, 258 are coupled to inputs of an AND gate 260 such that the output of AND gate 260 (i.e., the position signal 214) is high only when both of the magnetic field signals 200 and 202 are within the voltage range between the first and second threshold levels. Stated differently, the position signal 214 is active high to indicate the absence of a magnetic field of a predetermined strength. It will be appreciated by those of ordinary skill in the art that such a condition of slight or no magnetic field may correspond to the thumbwheel 158 (FIG. 4) being pushed inwards toward the housing of the handheld device in configurations where such motion moves the magnetic article 154 coupled to the thumbwheel away from the magnetic sensing elements 196, 198. In the illustrative embodiment, the first threshold level $B_{OP1}$, coupled to comparators 250a, 252a may be on the order of 10 Gauss and the second threshold level $B_{RP1}$ coupled to comparators 250b, 252b may be on the order of −10 Gauss.

The speed detection circuit 216 providing the speed signal 182 includes comparator circuit 224 and an exclusive-OR (XOR) gate 270. The comparator circuit 224 includes a first pair of comparators 272a, 272b and an OR gate 276 having inputs coupled to the outputs of the comparators 272a, 272b, for detecting when the magnetic field signal 200 is either greater than a respective first threshold level $B_{OP2}$ or less than a respective second threshold level $B_{RP2}$. Thus, the output signal of OR gate 276 is high when the magnetic field signal 200 is either greater than the first threshold level or less than the second threshold level. The comparator circuit 224 further includes a second pair of comparators 274a, 274b and an OR gate 278 having inputs coupled to the outputs of the comparators 274a, 274b, for detecting when the magnetic field signal 202 is either greater than the first threshold level $B_{OP2}$ or less than the second threshold level $B_{RP2}$. Thus, the output signal of OR gate 278 is high when the magnetic field signal 202 is either greater than the first threshold level or less than the second threshold level. The outputs of OR gates 276 and 278 are coupled to inputs of the XOR gate 270 and the speed signal 182 is provided at the output of XOR gate 270. Thus, the speed signal 182 transitions to a logic high level whenever either the magnetic field signal 200 is greater than the first threshold level or less than the second threshold level or when the magnetic field signal 202 is greater than the first threshold level or less than the second threshold level. With this arrangement, the speed signal 182 provided at the output of XOR gate 270 has a frequency of two times the frequency of either magnetic field signal 200, 202. In the illustrative embodiment, the first threshold level $B_{OP2}$ coupled to comparators 272a, 274a may be on the order of 40 Gauss and the second threshold level $B_{RP2}$ coupled to comparators 272b, 274b may be on the order of –40 Gauss.

The direction detection circuit 218 providing the direction signal 220 includes comparator circuit 224 and a D flip-flop 280. The output of OR gate 276 is coupled to the D input of the flip-flop 280 and the output of OR gate 278 is coupled to the clock input of flip-flop 280, as shown. The magnetic field signals 200, 202 are phase-shifted relative to one another as a result of the spacing of the magnetic field sensing elements 196, 198. Thus, the transition (high to low or low to high) of one signal can be used to clock the state of the other signal. The result can be used to determine the phase of the two signals relative to each other. In the example shown, when signal 278 clocks high, the state of signal 276 will be provided as direction signal 220. In a clockwise rotation example, direction signal 220 is low and results in a 0V direction output signal 178. Conversely, in counter-clockwise rotation, the signal 276 will be high when signal 278 clocks high, resulting in a high direction signal 220 and a Vdd direction output signal 178.

It will be appreciated by those of ordinary skill in the art that the detection circuit 210 is illustrative only and the detection circuitry may be implemented in various ways with various circuit elements and configurations.

According to the invention, the sensor 150 contains the dual sample rate feature and the user-programmable sample rate feature. To this end, the enable circuit 194 is coupled between a Vcc or power supply bus 176 and the processing circuits 206, 208 and the enable circuit 204 is coupled between the Vcc bus 176 and the detection circuit 210. As described above in connection with the enable circuits of FIG. 1, enable circuits 206, 208 are responsive to the clock signal 188 for connecting and disconnecting the power supply bus 176 to and from the respective circuits 206, 208 and 210. Thus, when the clock signal 188 is in a first state corresponding to the awake or sample intervals (e.g., a logic high state), power is provided to the processing circuits 206, 208 and the detection circuit 210 and when the clock signal is in a second state corresponding to the sleep intervals (e.g., a logic low state), power is disconnected from the processing circuits 206 and the detection circuit 210. Advantageously, both channels are simultaneously sampled (i.e., their sampling is synchronized) since the processing circuits 206, 208 and the detection circuit 210 (that processes both channels) is provided with power simultaneously via the clock signal control of the enable circuits. Thus, the detection of the magnetic field signals 200 and 202, and the resulting output signals of OR gates 276 and 278 will accurately reflect events occurring in the environment in which the device is placed; namely, the rotation direction of the magnet 154. While this synchronous sampling advantage is most notable with respect to the direction output signal 178, it is also provides the same benefit with respect to the speed output signal 174.

The particular manner in which the clock circuit 180 generates the clock signal 188 can be as described above in connection with any one of the clock circuit embodiments 60a, 60b, 60c of FIGS. 1A-1C. Thus, the sensor 150 can include just the dual sample rate feature in which case the clock circuit 180 can be provided by the embodiment 60a of FIG. 1A, the sensor can include just the user-programmable sample rate feature in which case the clock circuit 180 can be provided by the embodiment 60b of FIG. 1B or the sensor can include both the dual sample rate feature and the user-programmable sample rate feature in which case the clock circuit 180 can be provided by the embodiment 60c of FIG. 1C.

Figure 5:
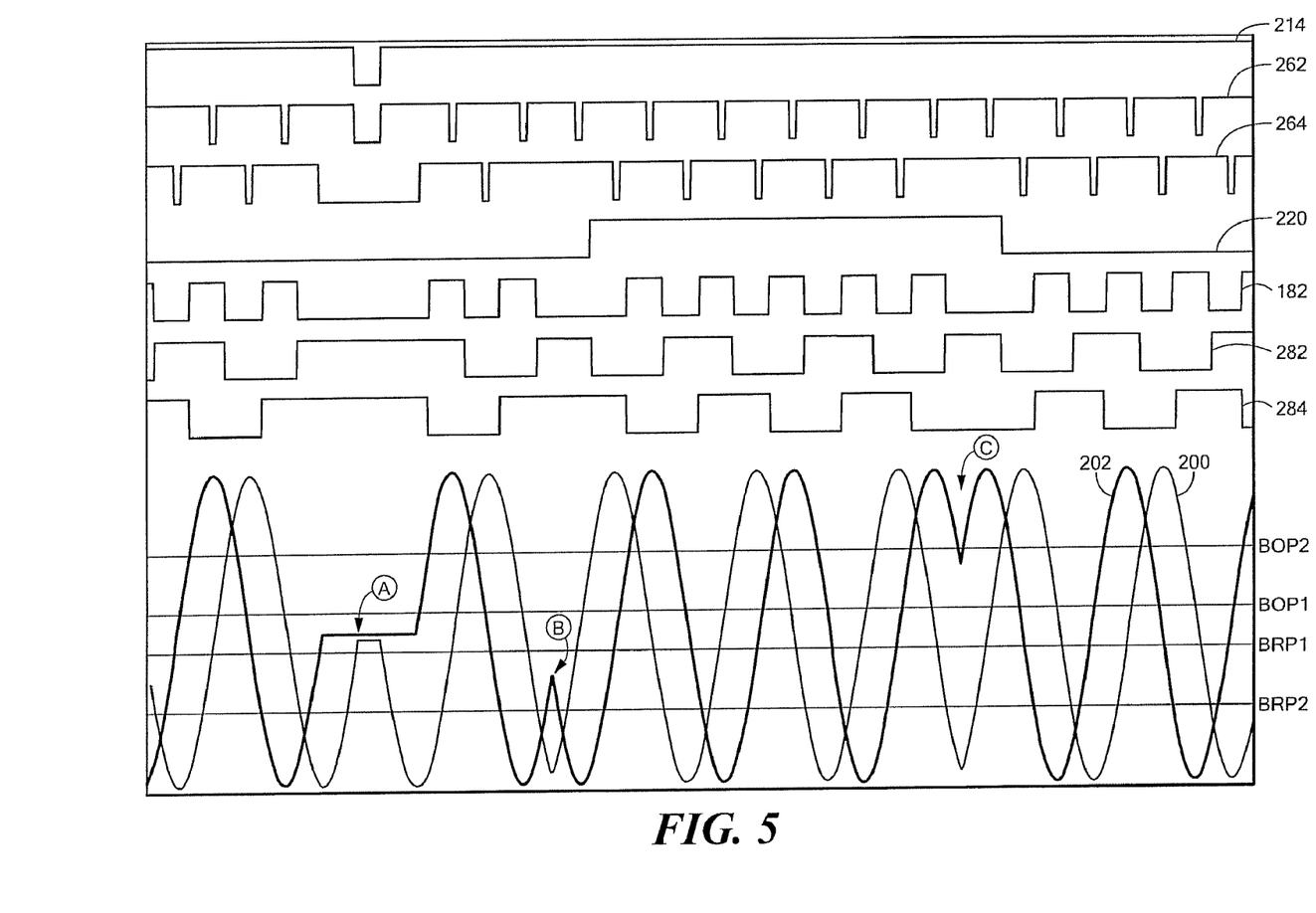
FIG. 5 shows several illustrative waveforms associated with the magnetic field sensor of FIG. 3.

Referring now to FIG. 5, operation of the sensor 150 of FIG. 3 will be described by reference to the illustrative waveforms including the position signal 214, the output signal 262 of AND gate 256, the output signal 264 of AND gate 258, the direction signal 220, the speed signal 182, the output signal 282 of OR gate 276, the output signal 284 of OR gate 178, and the magnetic field signals 200, 202 in relation to the first and second threshold levels $_{OP1}$, and $B_{RP1}$, respectively, coupled to comparators 250a, 250b, 252a, and 252b and the first and second threshold levels $B_{OP2}$ and $B_{RP2}$, respectively coupled to comparators 272a, 272b, 274a, and 274b.

At a time labeled "A", both of the magnetic field signals 200, 202 are within the voltage range established by the $B_{OP1}$ and $B_{RP1}$ threshold levels, as will occur when the magnetic article is moved away from the sensor 150 (e.g., when the thumbwheel is depressed and such depression causes the magnetic article 154 to move away from the Hall effect elements 196, 198). Once this condition occurs, the output signals 262, 264 of AND gates 256, 258, respectively, go low, thereby causing the position signal 214 to transition low, as shown. As noted above, the position signal 214 is active low and thus, the low going pulse of the position signal 214 is indicative of the sensed magnetic field falling below a predetermined level, or strength.

Also illustrated in FIG. 5 is the occurrence of a direction change of the rotation of the magnetic article 154, such as may coincide with a change in the direction of rotation of the thumbwheel 158 of FIG. 4. At a time labeled "B", a change of rotation direction occurs. This condition causes the direction signal 220 to change state upon the next negative-going edge of the output signal 284 of the OR gate 278 that is coupled to the clock input of the negative edge triggered flip-flop 280, since the output signal 282 of OR gate 276 is at a logic high level upon the occurrence of such clock edge. A subsequent rotation direction change occurs at a time labeled "C", which causes the direction signal 220 to again change state upon the next negative going edge of the output signal 284 of OR gate 278, since the output signal 282 of the OR gate 276 is at a logic low level upon the occurrence of such clock edge.

As noted above, the clock circuit 180 of the sensor 150 may be provided by any of the clock circuit embodiments 60a, 60b, 60c of FIGS. 1A, 1B, 1C, respectively. However, in the case of the clock circuit 180, the feedback signal which causes the sample rate to change from the first predetermined sample rate to the second predetermined sample rate in connection with the dual sample rate feature is provided by the speed signal 182 rather than by the comparison signal 38 (FIG. 1A, for example). By way of an example, in the case where the clock circuit 180 is provided by the clock circuit embodiment 60a of FIG. 1A, the clock signal 188 can be as shown by the illustrative clock signal 62 of FIG. 2 and the speed signal 182 can be as shown by the illustrative signal 18 of FIG. 2. Thus, although the clock signal is not shown in FIG. 5, it will be understood that, in this example, the clock signal 188 initially (following power up and prior to detection of a transition of the speed signal 182) corresponds to a first predetermined sample rate and thereafter corresponds to a second, faster predetermined sample rate for a predetermined duration established by the one-shot 74 (FIG. 1A) following detection of a transition (e.g., each positive-going transition) of the speed signal 182.

All references cited herein are hereby incorporated herein by reference in their entirety.

Having described preferred embodiments of the invention, it will now become apparent to one of ordinary skill in the art that other embodiments incorporating their concepts may be used.

For example, it will be appreciated by those of ordinary skill in the art that the inventive dual sample rate feature and the user-programmable sample rate feature may be used in other types of sensors for low power applications that would benefit from a low power sampling mode of operation during which, at least portions of the sensor are "asleep" for certain time intervals.

It is felt therefore that these embodiments should not be limited to disclosed embodiments, but rather should be limited only by the spirit and scope of the appended claims.

What is claimed is:

1. A magnetic field sensor, comprising:
    a semiconductor substrate on which are provided two, spaced magnetic field sensing elements, each providing a magnetic field signal proportional to a sensed magnetic field associated with a magnetic article;
    a circuit configured to process each of the magnetic field signals only during sample intervals occurring at a sample rate and to generate a first sensor output signal indicative of a speed of rotation of the magnetic article and a second sensor output signal indicative of a direction of rotation of the magnetic article; and
    a clock circuit providing a clock signal to the circuit, wherein the sample rate is controlled by the clock signal and is one of a first predetermined sample rate or a second, faster predetermined sample rate, wherein the clock circuit is responsive to the first sensor output signal and is configured initially to provide the clock signal corresponding to the first predetermined sample rate and to provide the clock signal corresponding to the second predetermined sample rate in response to a change of state of the first sensor output signal.

2. The sensor of claim 1 wherein the clock circuit reverts to providing the clock signal corresponding to the first predetermined sample rate after a predetermined duration following the change of state of the first sensor output signal.

3. The sensor of claim 1 wherein the circuit is responsive to an input signal for causing the circuit to process the magnetic field signals at a user-specified sample rate.

4. A magnetic field sensor, comprising:
    a semiconductor substrate on which are provided two, spaced magnetic field sensing elements, each providing a magnetic field signal proportional to a sensed magnetic field associated with a magnetic article; and
    a circuit configured to process each of the magnetic field signals only during sample intervals occurring at a sample rate and to generate a first sensor output signal indicative of a speed of rotation of the magnetic article, a second sensor output signal indicative of a direction of rotation of the magnetic article, and a third sensor output signal indicative of a position of the magnetic article relative to the magnetic field sensing elements.

5. The sensor of claim 4 further comprising a comparator circuit and a logic circuit for generating the third sensor output signal indicative of the magnetic article being in proximity to the magnetic field sensing elements when the first magnetic field signal is less than a first threshold level and greater than a second threshold level and when the second magnetic field signal is less than the first threshold level and greater than the second threshold level.

6. A magnetic field sensor, comprising:
    a semiconductor substrate on which are provided two, spaced magnetic field sensing elements, each providing a magnetic field signal proportional to a sensed magnetic field associated with a magnetic article;
    a circuit configured to process each of the magnetic field signals only during sample intervals occurring at a sample rate and to generate a first sensor output signal indicative of a speed of rotation of the magnetic article and a second sensor output signal indicative of a direction of rotation of the magnetic article; and
    a comparator circuit and a logic circuit for causing a transition of the first sensor output signal whenever the first magnetic field signal exceeds a first threshold level or falls below a second threshold level and whenever the second magnetic field signal exceeds the first threshold level or falls below the second threshold level.

7. A magnetic field sensor, comprising:
    a semiconductor substrate on which are provided two, spaced magnetic field sensing elements, each providing a magnetic field signal proportional to a sensed magnetic field associated with a magnetic article;
    a circuit configured to process each of the magnetic field signals only during sample intervals occurring at a sample rate and to generate a first sensor output signal indicative of a speed of rotation of the magnetic article and a second sensor output signal indicative of a direction of rotation of the magnetic article; and
    a comparator circuit and a logic circuit for generating the second sensor output signal to indicate a first direction of rotation of the magnetic article when the first magnetic field signal leads the second magnetic field signal and to indicate a second direction of rotation of the magnetic article when the second magnetic field signal leads the first magnetic field signal.

8. A magnetic field sensor, comprising:
    a magnetic field sensing element providing a magnetic field signal proportional to a sensed magnetic field associated with a magnetic article; and
    a circuit configured to process the magnetic field signal only during sample intervals occurring at a sample rate and to generate a sensor output signal indicative of the sensed magnetic field, wherein the sample rate initially corresponds to a first predetermined sample rate and wherein the sample rate corresponds to a second, faster predetermined sample rate in response to a change of state of the sensor output signal.

9. The sensor of claim 8 wherein the circuit comprises a comparator circuit responsive to the magnetic field signal for comparing the magnetic field signal to a first threshold level and a second threshold level to provide the sensor output signal at a first signal level when the magnetic field signal is less than the first threshold level and greater than the second threshold level.

10. The sensor of claim 9 further comprising a clock circuit having an input receiving the sensor output signal and providing a clock signal to the comparator circuit wherein, initially the clock signal corresponds to the first predetermined sample rate and wherein the clock signal corresponds to the second predetermined sample rate in response to a change of state of the sensor output signal.

11. The sensor of claim 10 wherein the clock circuit reverts to providing the clock signal corresponding to the first predetermined sample rate after a predetermined duration following the change of state of the sensor output signal.

12. The sensor of claim 8 further comprising a clock circuit responsive to an external clock signal for causing the circuit to sample the magnetic field signal at a sample rate associated with the external clock signal.

13. A magnetic field sensor, comprising:
   a magnetic field sensing element providing a magnetic field signal proportional to a sensed magnetic field associated with a magnetic article; and
   a circuit configured to process the magnetic field signal only during sample intervals occurring at a user-specified sample rate and to generate a sensor output signal indicative of a characteristic of the magnetic article, wherein the characteristic is at least one of a speed of rotation of the magnetic article or a direction of rotation of the magnetic article, wherein the sample rate initially corresponds to a first predetermined sample rate and wherein the sample rate corresponds to a second, faster predetermined sample rate in response to a change of state of the sensor output signal.

14. A magnetic field sensor, comprising:
   a magnetic field sensing element providing a magnetic field signal proportional to a sensed magnetic field associated with a magnetic article;
   a circuit responsive to the magnetic field signal and to a clock signal having a sample rate and configured to process the magnetic field signal only during sample intervals occurring at the sample rate to generate a sensor output signal indicative of a characteristic of the magnetic article, wherein the sample rate initially corresponds to a first predetermined sample rate and wherein the sample rate corresponds to a second, faster predetermined sample rate in response to a change of state of the sensor output signal; and
   a clock circuit responsive to at least one user-provided input signal and configured to generate the clock signal wherein the sample rate of the clock signal is a user-programmable one of (a) initially a first predetermined sample rate and a second predetermined sample rate for a predetermined time interval following a change of state of the sensor output signal; (b) a user-defined sample rate; or (c) a fixed, predetermined sample rate.

15. The magnetic field sensor of claim 14 wherein the characteristic is at least one of a proximity of the magnetic article with respect to the magnetic field sensing element, a speed of rotation of the magnetic article, or a direction of rotation of the magnetic article.

* * * * *

UNITED STATES PATENT AND TRADEMARK OFFICE
CERTIFICATE OF CORRECTION

PATENT NO.          : 8,008,908 B2
APPLICATION NO.     : 11/767549
DATED               : August 30, 2011
INVENTOR(S)         : Doogue et al.

It is certified that error appears in the above-identified patent and that said Letters Patent is hereby corrected as shown below:

Col. 1 line 52, delete "an" and replace with -- a --.

Col. 2 line 8, delete "includes" and replace with -- including --.

Col. 10 line 28, delete "at a fixed," and replace with -- a fixed, --.

Col. 12 line 24, "$B_{OP}$," and replace with -- $B_{OP1}$, --.

Col. 13 line 54, "circuits 206" and replace with -- circuits 206, 208 --.

Col. 13 line 66, ", it is also" and replace with -- , it also --.

Col. 14 line 20, delete "$_{OP1}$," and replace with -- $B_{OP1}$, --.

Signed and Sealed this
Eighth Day of November, 2011

David J. Kappos
*Director of the United States Patent and Trademark Office*